US008811898B2

(12) United States Patent
Sekita et al.

(10) Patent No.: US 8,811,898 B2
(45) Date of Patent: Aug. 19, 2014

(54) INFORMATION PROCESSING DEVICE, COMMUNICATION CONTROL METHOD AND PROGRAM

(75) Inventors: Suguru Sekita, Saitama (JP); Kiyotada Yokogi, Tokyo (JP)

(73) Assignee: Felica Networks, Inc., Tokyo (JP)

( * ) Notice: Subject to any disclaimer, the term of this patent is extended or adjusted under 35 U.S.C. 154(b) by 367 days.

(21) Appl. No.: 12/628,698

(22) Filed: Dec. 1, 2009

(65) Prior Publication Data

US 2010/0136911 A1 Jun. 3, 2010

(30) Foreign Application Priority Data

Dec. 2, 2008 (JP) ................................ P2008-307665

(51) Int. Cl.
*H04B 7/00* (2006.01)

(52) U.S. Cl.
USPC .......... 455/41.2; 455/41.1; 455/41.3; 455/39; 455/73; 455/68; 455/558; 340/10.4

(58) Field of Classification Search
CPC .......... H04B 5/02; H04B 5/0012; H04B 5/00; H04W 88/06; H04W 76/02; H04W 8/005; H04M 2250/02; G06F 1/1613
USPC .......... 455/41.2, 73, 39, 333, 538, 10.1, 41.1, 455/41.3, 68, 63.1, 127.1, 127.2, 127.3, 70, 455/558, 1.1; 340/10.4
See application file for complete search history.

(56) References Cited

U.S. PATENT DOCUMENTS 5,966,404 A * 10/1999 Yokota et al. ................. 375/219
6,965,639 B2 * 11/2005 Uesugi .......................... 375/225
7,255,283 B2 * 8/2007 Akaida et al. ................. 235/492
7,558,540 B2 * 7/2009 Jin et al. ...................... 455/127.2
7,881,660 B2 * 2/2011 Takeda et al. ................ 455/11.1
8,436,718 B2 * 5/2013 Goto et al. .................... 340/10.4
2006/0023693 A1 * 2/2006 Aso et al. ...................... 370/351
2006/0171414 A1 * 8/2006 Katibian et al. .............. 370/468
2006/0246839 A1 * 11/2006 Nakao ............................ 455/39
2007/0032198 A1 * 2/2007 Sakamoto ....................... 455/69
2008/0125135 A1 * 5/2008 Uchida et al. ............... 455/452.1
2008/0220726 A1 * 9/2008 Gulati et al. .................... 455/69

(Continued)

FOREIGN PATENT DOCUMENTS

JP 2001-344574 12/2001
JP 2005-11009 1/2005

(Continued)

OTHER PUBLICATIONS

Japanese Office Action issued Sep. 21, 2010 for corresponding Japanese Appln. No. 2008-307665.

*Primary Examiner* — Temesgh Ghebretinsae
*Assistant Examiner* — M D Talukder
(74) *Attorney, Agent, or Firm* — K&L Gates LLP

(57) ABSTRACT

An information processing device is provided. The information processing device including a communication antenna having a variable Q value, for performing contactless-type communication with an external device by using a communication path capable of transmitting and receiving a signal using a carrier of a predetermined frequency, a communication speed determining unit for determining a communication speed in the communication with the external device, and a communication controlling unit for allowing the Q value of the communication antenna to be set to a value corresponding to a determined communication speed based on the communication speed determined in the communication speed determining unit.

11 Claims, 8 Drawing Sheets

(56) References Cited

U.S. PATENT DOCUMENTS

| | | | | |
|---|---|---|---|---|
| 2008/0238658 | A1* | 10/2008 | Yamada | 340/539.3 |
| 2009/0036062 | A1* | 2/2009 | Tanaka et al. | 455/69 |
| 2009/0267736 | A1* | 10/2009 | Watanabe et al. | 340/10.1 |
| 2009/0314830 | A1* | 12/2009 | Sawada et al. | 235/375 |
| 2009/0322484 | A1* | 12/2009 | Toriyama et al. | 340/10.1 |
| 2010/0048144 | A1* | 2/2010 | Fukami et al. | 455/68 |
| 2010/0056129 | A1* | 3/2010 | Kono | 455/419 |
| 2010/0136911 | A1* | 6/2010 | Sekita et al. | 455/41.2 |
| 2010/0328045 | A1* | 12/2010 | Goto et al. | 340/10.4 |
| 2011/0294428 | A1* | 12/2011 | Hatakeyama | 455/41.2 |

FOREIGN PATENT DOCUMENTS

| | | | |
|---|---|---|---|
| JP | 2005-323178 | | 11/2005 |
| JP | 2007-199871 | | 8/2007 |
| JP | 2007-199871 | * | 9/2007 |
| JP | 2008-191961 | | 8/2008 |

* cited by examiner

INFORMATION PROCESSING DEVICE, COMMUNICATION CONTROL METHOD AND PROGRAM

CROSS REFERENCES TO RELATED APPLICATIONS

The present application claims priority to Japanese Priority Patent Application JP 2008-307665 filed in the Japan Patent Office on Dec. 2, 2008, the entire content of which is hereby incorporated by reference.

BACKGROUND

The present application relates to an information processing device, a communication control method and a program.

Recently, an information processing device capable of performing contactless-type communication with a reader/writer (or an information processing device having a reader/writer function) such as a contactless-type integrated circuit (IC) card, a radio frequency identification (RFID) tag and a cell phone on which a contactless-type IC chip is mounted becomes widely used.

The reader/writer (or the information processing device having the reader/writer function, similarly hereinafter) and the information processing device such as the IC card and the cell phone use a magnetic field (carrier) of a specific frequency such as 13.56 MHz in communication. Specifically, the reader/writer transmits the carrier on which a carrier signal is put, and the information processing device, which receives the carrier by an antenna, returns a response signal to the carrier signal received by load modulation, and by this, the reader/writer and the information processing device perform the communication.

Also, the information processing device capable of performing the contactless-type communication with the above-described reader/writer may safely transmit/receive and update data of which falsification becomes issue, such as electronic money, by including a tamper-resistant IC chip. Therefore, a variety of services using the information processing device on which the IC chip capable of performing the contactless-type communication with the above-described reader/writer is mounted is socially widely provided. Then, with spreading of the service provision, the information processing device on which the contactless-type IC chip is mounted such as the IC card and the cell phone becomes more widely used.

In such a circumstance, a wide variety of techniques regarding the contactless-type communication are developed. As a technique to perform the communication with a communication distance defined by distance specification information by changing a Q value of the antenna based on the distance specification information to define the communication distance, there is Japanese Patent Application Laid-Open No. 2005-323178, for example. Also, as a technique to prevent excessive increase in temperature of the IC chip by changing the Q value of the antenna according to the temperature of the IC chip, there is Japanese Patent Application Laid-Open No. 2005-11009, for example.

The reader/writer (or the information processing device having the reader/writer function; hereinafter, referred to as the "reader/writer" as a matter of convenience) and the information processing device such as the IC card and the cell phone perform the contactless-type communication using the magnetic field (hereinafter, referred to as the "carrier") of the specific frequency such as 13.56 MHz, for example. More specifically, the reader/writer transmits the carrier on which the carrier signal is put, and the information processing device, which receives the carrier by the antenna, returns the response signal to the carrier signal received by the load modulation. The reader/writer demodulates the above-described response signal by detecting an amplitude change of a voltage at an antenna end generated by the load modulation, for example. The contactless-type communication is performed in the above-described manner, for example, between the reader/writer and the information processing device. As a communication speed in the communication using the carrier between the reader/writer and the information processing device, there are various speeds such as 106 [kbps], 212 [kbps], 424 [kbps] and the like. Also, the above-described communication speed depends on the communication function included in the reader/writer and the information processing device, for example.

The above-described difference in the communication speed is presented in a size of the voltage of the carrier signal at the antenna of the reader/writer, for example. More specifically, when the Q value of the antenna of the reader/writer is a certain value (constant value), for example, the faster the communication speed is, the smaller the size of the voltage corresponding to the carrier signal in the antenna is. Herein, the above-described phenomenon also applies to the information processing device for transmitting the response signal by performing the load modulation, for example. The above description indicates that the faster the communication speed is, the lower the stability of the communication between the reader/writer and the information processing device becomes, for example.

Herein, a related art that performs the communication with a communication distance defined by the distance specification information (hereinafter, also referred to as "a related art 1") switches the Q value of the antenna for performing the communication with the communication distance defined by the distance specification information. By changing the Q value of the antenna, the reader/writer and the information processing device to which the related art 1, for example, is applied might be able to stabilize the communication with the communication distance defined by the distance specification information. However, the related art 1 merely changes the Q value according to the communication distance defined by the distance specification information based on a user input, for example. Also, the related art 1 does not make consideration at all of lowering of the stability of the communication due to the communication speed between the above-described reader/writer and information processing device. Therefore, even when the related art 1 is used, the stabilization of the communication is not realized when the reader/writer and the information processing device perform the communication at a higher communication speed with a certain communication distance, for example.

Also, the information processing device to which the related art to prevent the excessive increase in temperature of the IC chip (hereinafter, also referred to as a "related art 2") is applied merely changes the Q value of the antenna according to the temperature of the IC chip. Also, this does not make consideration at all of the lowering of the stability of the communication due to the communication speed between the above-described reader/writer and information processing device. Therefore, even when the related art 2 is used, the stabilization of the communication between the reader/writer and the information processing device is not realized.

SUMMARY

In light of the foregoing, it is desirable to provide a novel and improved information processing device, communication control method and program, capable of stabilizing the communication based on the communication speed in the contactless-type communication between the reader/writer and the information processing device.

According to an embodiment, there is provided an information processing device including a communication antenna having a variable Q value, for performing contactless-type communication with an external device by using a communication path capable of transmitting and receiving a signal using a carrier of a predetermined frequency, a communication speed determining unit for determining a communication speed in the communication with the external device, and a communication controlling unit for allowing the Q value of the communication antenna to be set to a value corresponding to a determined communication speed based on the communication speed determined in the communication speed determining unit.

According to such a configuration, the communication may be stabilized based on the communication speed in the contactless-type communication between the reader/writer and the information processing device.

The information processing device may further include a carrier signal generating unit for generating a carrier signal of the predetermined frequency to be transmitted to the external device, and an amplifying unit having a variable amplification factor, for amplifying the carrier signal with a set amplification factor to transmit to the communication antenna. The communication controlling unit may allow the amplification factor of the amplifying unit to be set to a value corresponding to the Q value of the communication antenna based on the communication speed determined in the communication speed determining unit, the Q value being set by the communication controlling unit.

The communication speed determining unit may selectively change the communication speed during the communication based on the communication with the external device, and generates communication speed information indicating a changed communication speed to transmit to the communication controlling unit when the communication speed is changed, and the communication controlling unit may set the Q value of the communication antenna to a value corresponding to the communication speed indicated by the communication speed information according to transmission of the communication speed information.

The communication controlling unit may selectively transmit a setting signal to set the Q value to the communication antenna based on the communication speed determined in the communication speed determining unit, and the communication antenna may include a resonance circuit having a coil having predetermined inductance and a capacitor having a predetermined electrostatic capacitance, and a Q value adjustment circuit for selectively activating a load for changing the Q value according to the setting signal or changing a resistance value of the load according to the setting signal.

The information processing device may be a portable communication device.

The information processing device may be an IC card.

According to another embodiment, there is provided a method includes the steps of controlling communication includes the steps of determining a communication speed in communication with an external device through a communication antenna having a variable Q value for performing contactless-type communication with the external device by using a communication path capable of transmitting and receiving a signal using a carrier of a predetermined frequency, and allowing the Q value of the communication antenna to be set to a value corresponding to a determined communication speed based on the communication speed determined at the step of determining.

By use of such a method, the communication may be stabilized based on the communication speed in the contactless-type communication between the reader/writer and the information processing device.

According to another embodiment, there is provided a program for causing a computer to execute the steps of determining a communication speed in communication with an external device through a communication antenna having a variable Q value for performing contactless-type communication with the external device by using a communication path capable of transmitting and receiving a signal using a carrier of a predetermined frequency, and allowing the Q value of the communication antenna to be set to a value corresponding to a determined communication speed based on the communication speed determined at the step of determining.

By use of such a program, the communication may be stabilized based on the communication speed in the contactless-type communication between the reader/writer and the information processing device.

According to an embodiment, the communication may be stabilized based on the communication speed in the contactless-type communication between the reader/writer and the information processing device.

Additional features and advantages are described herein, and will be apparent from the following Detailed Description and the figures.

DETAILED DESCRIPTION

Figure 1:
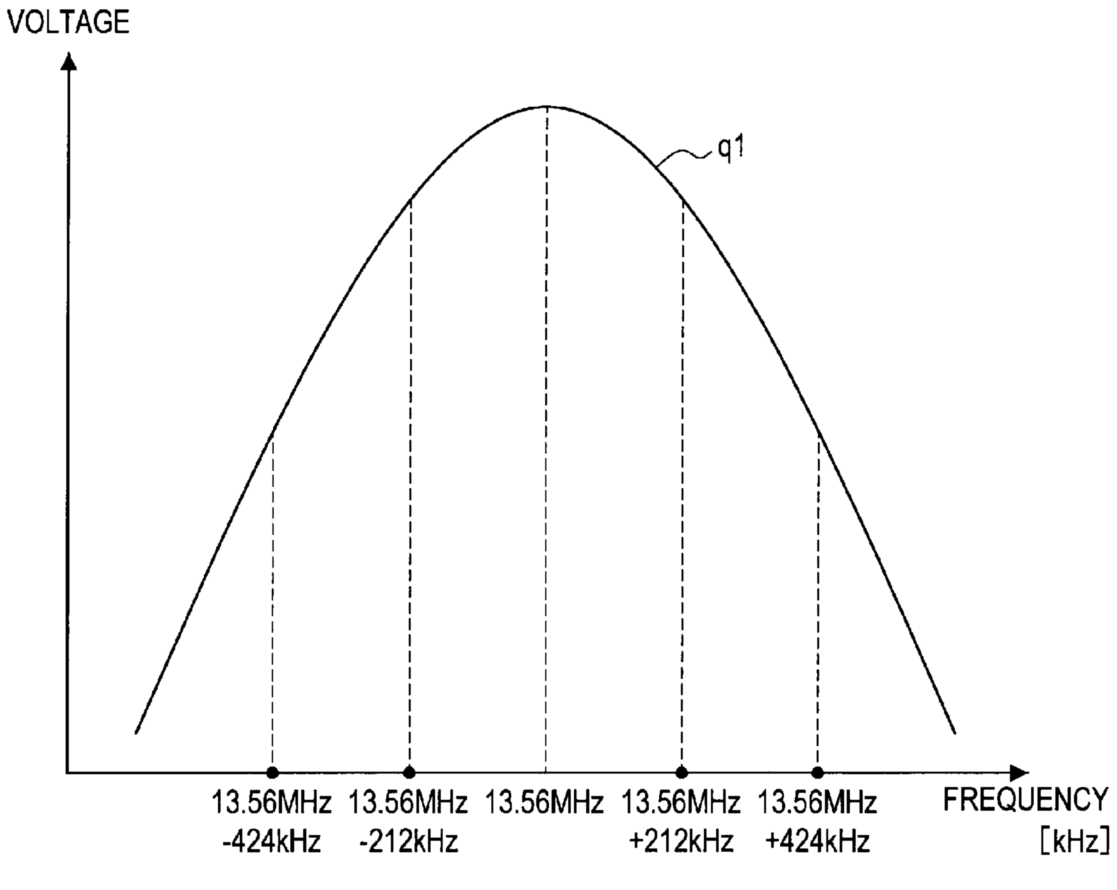
FIG. 1 is a first illustration diagram for illustrating a communication stabilization approach according to an embodiment.

The present application will be described in detail with reference to the appended drawings according to an embodiment. Note that, in this specification and the appended drawings, structural elements that have substantially the same function and structure are denoted with the same reference numerals, and repeated explanation of these structural elements is omitted.

Also, hereinafter, it is described in an order described below.

1. Approach according to an embodiment of the present application.

2. Communication system according to the embodiment of the present application.

3. Program regarding the communication system according to an embodiment of the present application.

(Approach According to Embodiment)

Before describing a configuration of the communication system according to the embodiment, a communication stabilization approach in contactless-type communication (hereinafter, referred to as "contactless communication") of the communication system (hereinafter, referred to as a "communication system 1000") according to the embodiment is first described. Herein, the communication system 1000 has an information processing device having a function to subjectively transmit a carrier (reader/writer function) and an information processing device, which receives the carrier and responds by load modulation, and performs the contactless communication by using a communication path using the carrier. Hereinafter, for convenience of description, the information processing device having the function to subjectively transmit the carrier is referred to as a "reader/writer 100", and the information processing device, which responds to the reader/writer 100 by the load modulation is referred to as an "information processing device 200". Both of the reader/writer 100 and the information processing device 200 described hereinafter correspond to the information processing device according to the embodiment to which the communication stabilization approach according to the embodiment is applicable.

Also, hereinafter, the communication stabilization approach according to the embodiment is described by taking the reader/writer 100 as an example. The communication stabilization approach according to the embodiment may also be applied to the information processing device 200.

FIG. 1 is a first illustration diagram for illustrating the communication stabilization approach according to the embodiment. FIG. 1 shows an example of a relationship between a communication speed and a voltage at an antenna end of an antenna when transmitting a carrier signal to the information processing device 200, in a case in which a Q value of the antenna (a communication antenna 106 to be described) of the reader/writer 100 is Q=Q1. Also, FIG. 1 shows a case in which a frequency of the carrier is 13.56 MHz. In the example in FIG. 1, the communication speed is represented by a frequency shift from 13.56 MHz, and the larger the frequency shift is, the faster the communication speed is.

Herein, the carrier signal according to the embodiment is a signal corresponding to data or the like, which is transmitted to the information processing device 200 by the reader/writer 100, for example. The reader/writer 100 generates the carrier signal by performing amplitude shift keying (ASK) modulation, for example, and transmits the carrier signal from the antenna (to be described).

Referring to FIG. 1, it is understood that, when the Q value of the antenna is constant (Q1), the faster the communication speed is, the smaller the voltage of the antenna end of the antenna is. This indicates that the faster the communication speed is, the more difficult it is for the carrier signal to be transmitted to the information processing device 200, when the Q value of the antenna is constant (Q1). That is to say, when the Q value of the antenna is constant (Q1), the faster the communication speed is, the lower the stability of the contactless communication between the reader/writer 100 and the information processing device 200 becomes. Herein, although the stability of the above-described communication may be represented by probability of realization of normal communication, for example, this is not limited to the above description.

The communication system 1000 according to the embodiment stabilizes the contactless communication by a first communication stabilization approach or a second communication stabilization approach described below, for example.

[1] First Communication Stabilization Approach

First, the first communication stabilization approach according to the embodiment is described. Herein, the first communication stabilization approach according to the embodiment may be applied to both of the reader/writer 100 and the information processing device 200. Hereinafter, the first communication stabilization approach according to the embodiment is described by taking the reader/writer 100 as an example.

The reader/writer 100 switches the Q value of the antenna according to the communication speed, in order to solve the issue described with reference to FIG. 1.

Figure 2:
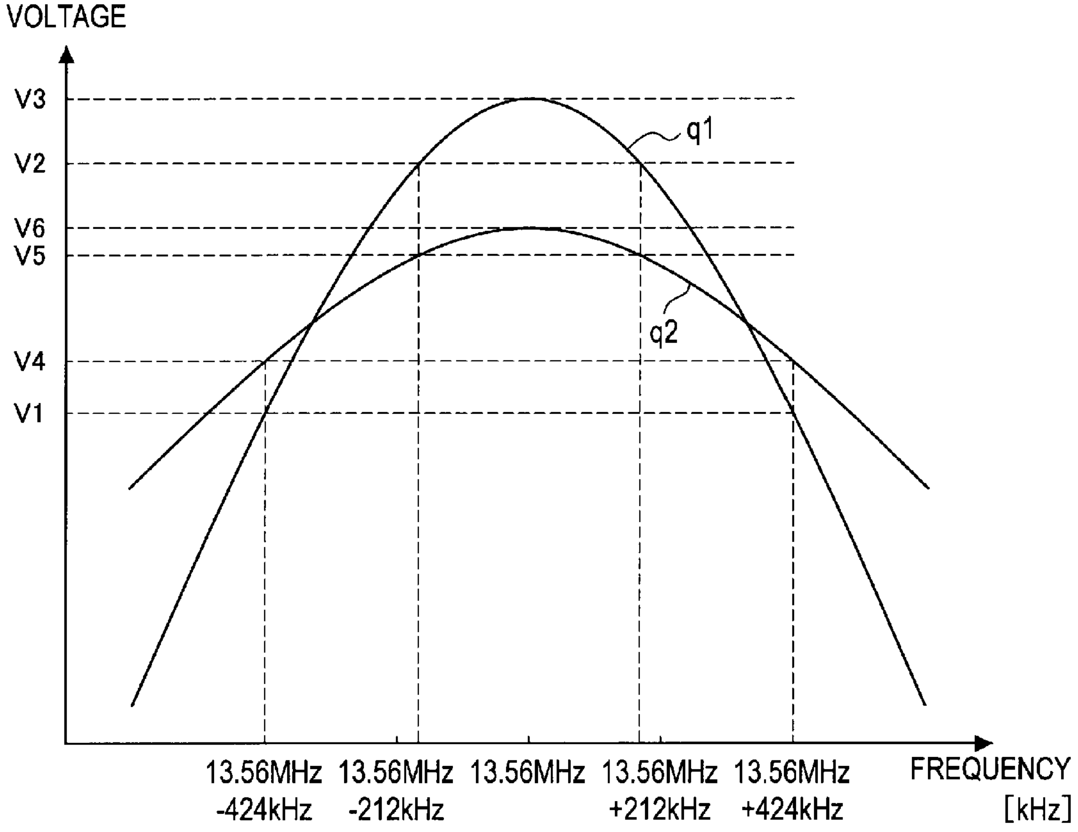
FIG. 2 is a second illustration diagram for illustrating a communication stabilization approach according to the embodiment.

FIG. 2 is a second illustration diagram for illustrating the communication stabilization approach according to the embodiment. Herein, FIG. 2 shows an example of the relationship between the communication speed and the voltage at the antenna end of the antenna of the reader/writer 100, as in FIG. 1. q1 shown in FIG. 2 represents an example of the relationship between the communication speed and the voltage at the antenna end of the antenna in a case in which the Q value of the antenna (to be described) of the reader/writer 100 is Q=Q1 as in FIG. 1. Also, q2 shown in FIG. 2 represents an example of the relationship between the communication speed and the voltage at the antenna end of the antenna in a case in which the Q value of the antenna (to be described) of the reader/writer 100 is Q=Q2 (Q2<Q1).

Referring to FIG. 2, it is understood that the voltages at the antenna end when the Q value is Q1 and when the Q value is Q2 have a following relationship:

when the communication speed is 212 kHz: V2(q1)>V5 (q2)

when the communication speed is 424 kHz: V4(q2)>V1 (q1)

Therefore, it is understood from FIG. 2 that when the communication speed is 212 kHz, the communication is more stabilized when the Q value of the antenna is set to Q1 than when the Q value of the antenna is set to Q2. Also, it is understood from FIG. 2 that when the communication speed is 424 kHz, the communication is more stabilized when the Q value of the antenna is set to Q2 than when the Q value of the antenna is set to Q1. That is to say, the reader/writer 100 may stabilize the contactless communication by lowering the Q value of the antenna as the communication speed becomes faster.

Although cases in which the communication speed is 212 kHz and in which the communication speed is 424 kHz are compared and described above, as is clear from q1 and q2 in FIG. 2, the above-described relationship is realized not only when comparing the cases in which the communication speed is 212 kHz and in which the communication speed is 424 kHz. For example, in the example in FIG. 2, when comparing the cases in which the communication speed is 212 kHz and in which the communication speed is 848 kHz, when the Q value of the antenna is Q1, the voltage at the antenna end becomes larger when the communication speed is 212 kHz than when the communication speed is 848 kHz. Also, when the Q value of the antenna is Q2, the voltage at the antenna end becomes larger when the communication speed is 848 kHz than when the communication speed is 212 kHz. Herein, although the case in which the communication speed is 848 kHz is not shown in FIG. 2, as described above, the faster the communication speed is, the larger the frequency shift from the frequency of the carrier (13.56 MHz in FIG. 2) is. That is to say, the frequency at which the communication speed is 848 kHz corresponds to "13.56 MHz−848 kHz" and "13.56 MHz+848 kHz".

The reader/writer 100 focuses on the relationship shown in FIG. 2, and sets the Q value of the antenna to a value corresponding to the communication speed according to the communication speed. More specifically, the reader/writer 100 lowers the Q value of the antenna as the communication speed becomes faster. Herein, as a setting example of the Q value of the antenna in the reader/writer 100, for example, the Q value of the antenna is set to Q=50 when the communication speed is 212 kHz, and the Q value of the antenna is set to Q=40 when the communication speed is 424 kHz; however, this is not limited to the above description.

By the setting of the Q value of the antenna according to the communication speed by the reader/writer 100, the contactless communication with the information processing device 200 may be more stabilized. Although the setting of the Q value of the antenna according to the communication speed in the reader/writer 100 is described above, the information processing device 200 may also set the Q value of the antenna according to the communication speed in the same manner.

[Communication Control Method According to First Communication Stabilization Approach]

Figure 3:
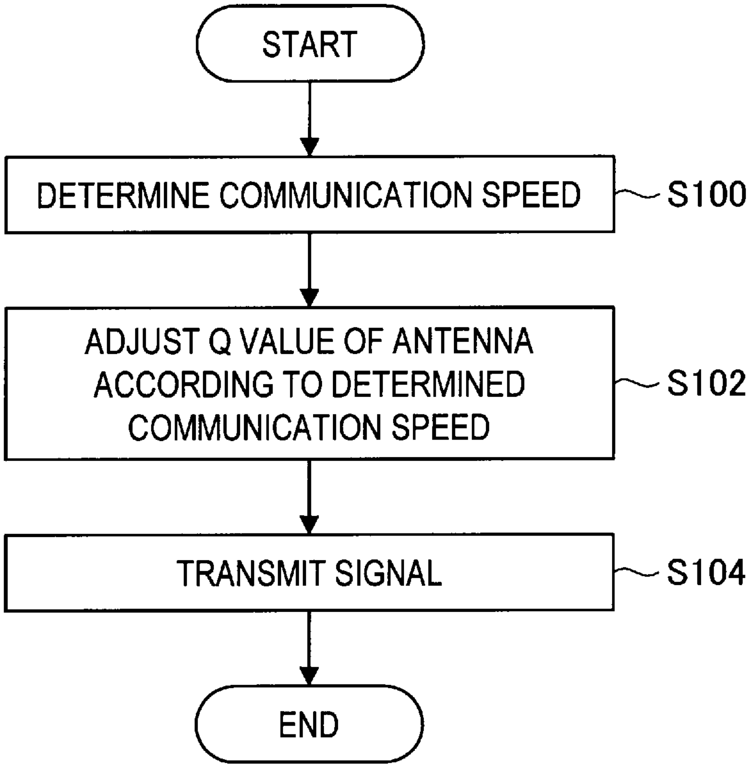
FIG. 3 is a first flowchart showing an example of a communication control method according to the embodiment.

Next, an example of a communication control method in the first communication stabilization approach according to the embodiment is described. FIG. 3 is a first flowchart showing an example of the communication control method according to the embodiment. Hereinafter, although it is described assuming that the communication control method shown in FIG. 3 is performed by the reader/writer 100, the communication control method shown in FIG. 3 may also be applied to the information processing device 200.

The reader/writer 100 determines the communication speed (S100). Herein, as a method of determining the communication speed in the reader/writer 100, there are following methods (a) and (b), for example.

(a) First Method of Determining Communication Speed

The reader/writer 100 determines the communication speed based on communication setting information including information regarding a communication function of its own device such as a communication speed and a communication system, which this supports, for example. More specifically, the reader/writer 100 stores the communication setting information in a recording medium such as a read only memory (ROM) in advance. Then, the reader/writer 100 reads the communication setting information stored in the recording medium and determines the communication speed using the information of the communication speed included in the communication setting information.

(b) Second Method of Determining Communication Speed

The method of determining the communication speed based on the communication setting information stored in advance is described above. Herein, there is a case in which not only information of one communication speed but also information of a plurality of communication speeds are included in the communication setting information (that is to say, a case in which the reader/writer 100 supports the contactless communication at a plurality of communication speeds). Therefore, next, the method of determining the communication speed which selectively changes (determines) the communication speed during the communication with the information processing device 200 is described as an example of the method of determining the communication speed in a case in which the reader/writer 100 supports the contactless communication at a plurality of communication speeds.

The reader/writer 100 first starts the communication with the information processing device 200 at a low communication speed out of the communication speeds at which the communication is possible (or the communication speed at which the communication is generally possible in communication standards, for example). At that time, the reader/writer 100 may perform a process regarding an adjustment of the Q value to be described (process of a step S102). When the communication is started, the reader/writer 100 transmits to the information processing device 200 a communication speed request to require the information of the communication speed, which this supports, for example. Herein, the reader/writer 100 may include the information of the communication speed, which its own device supports, in the above-described communication speed request, for example. When receiving the information of the communication speed transmitted from the information processing device 200 in response to the above-described communication speed request, the reader/writer 100 grasps the communication speed, which the information processing device 200 supports, based on the received information of the communication speed. Then, the reader/writer 100 changes the communication speed when judging that the communication at a higher communication speed is possible (that is to say, when the information processing device 200 supports a higher communication speed) based on the grasped communication speed, which the information processing device 200 supports. Also, the reader/writer 100 does not change the communication speed when judging that the communication at the higher communication speed is not possible.

The reader/writer 100 may selectively change (determine) the communication speed during the communication with the information processing device 200 by performing the above-described process, for example. Therefore, the reader/writer 100 may perform the communication with the information processing device 200 at a higher communication speed out of the communication speeds at which the normal communication is possible.

The reader/writer 100 determines the communication speed by the above-described methods (a) and (b), for example. Meanwhile, it goes without saying that the method of determining the communication speed in the reader/writer 100 is not limited to the above-described methods (a) and (b).

When the communication speed is determined at the step S100, the reader/writer 100 adjusts the Q value of the antenna according to the determined communication speed (S102). Herein, although the reader/writer 100 adjusts the Q value of the antenna by selectively activating/deactivating load resistance, which composes an antenna circuit, based on the communication speed determined at the step S100, for example, this is not limited to the above description.

When the Q value of the antenna is adjusted at the step S102, the reader/writer 100 transmits the carrier signal to the information processing device 200 (S104). Herein, when the information processing device 200 performs the communication control method shown in FIG. 3, a process of the step S104 corresponds to transmission of a response signal by the load modulation, for example.

The reader/writer 100 may perform the communication with the information processing device 200 after adjusting the Q value of the antenna according to the communication speed by using the method shown in FIG. 3, for example. Therefore, the reader/writer 100 may stabilize the contactless communication by using the method shown in FIG. 3, for example.

[2] Second Communication Stabilization Approach

In the above description, it is described that the reader/writer 100 and/or the information processing device 200 stabilize the communication by setting the Q value of the antenna thereof based on the communication speed, as the first communication stabilization approach according to the embodiment. However, the communication stabilization approach according to the embodiment is not limited to the above-described first communication stabilization approach. Then, a second communication stabilization approach according to the embodiment is described next. Although the second communication stabilization approach according to the embodiment is described by taking the reader/writer 100 as an example hereinafter, this may also be applied to the information processing device 200 as in the case of the first communication stabilization approach.

Referring again to FIG. 2, it is understood that a peak of the voltage of the antenna lowers (that is to say, V3(q1)>V6(q2)) when the reader/writer 100 switches the Q value of the antenna from Q1 to Q2 (Q2<Q1). Herein, the above description corresponds to lowering of an output of the carrier transmitted by the reader/writer 100. Then, in the second communication stabilization approach according to the embodiment, in addition to the setting of the Q value based on the communication speed as in the first communication stabilization approach, the carrier signal is amplified with an amplification factor according to the communication speed.

Figure 4:
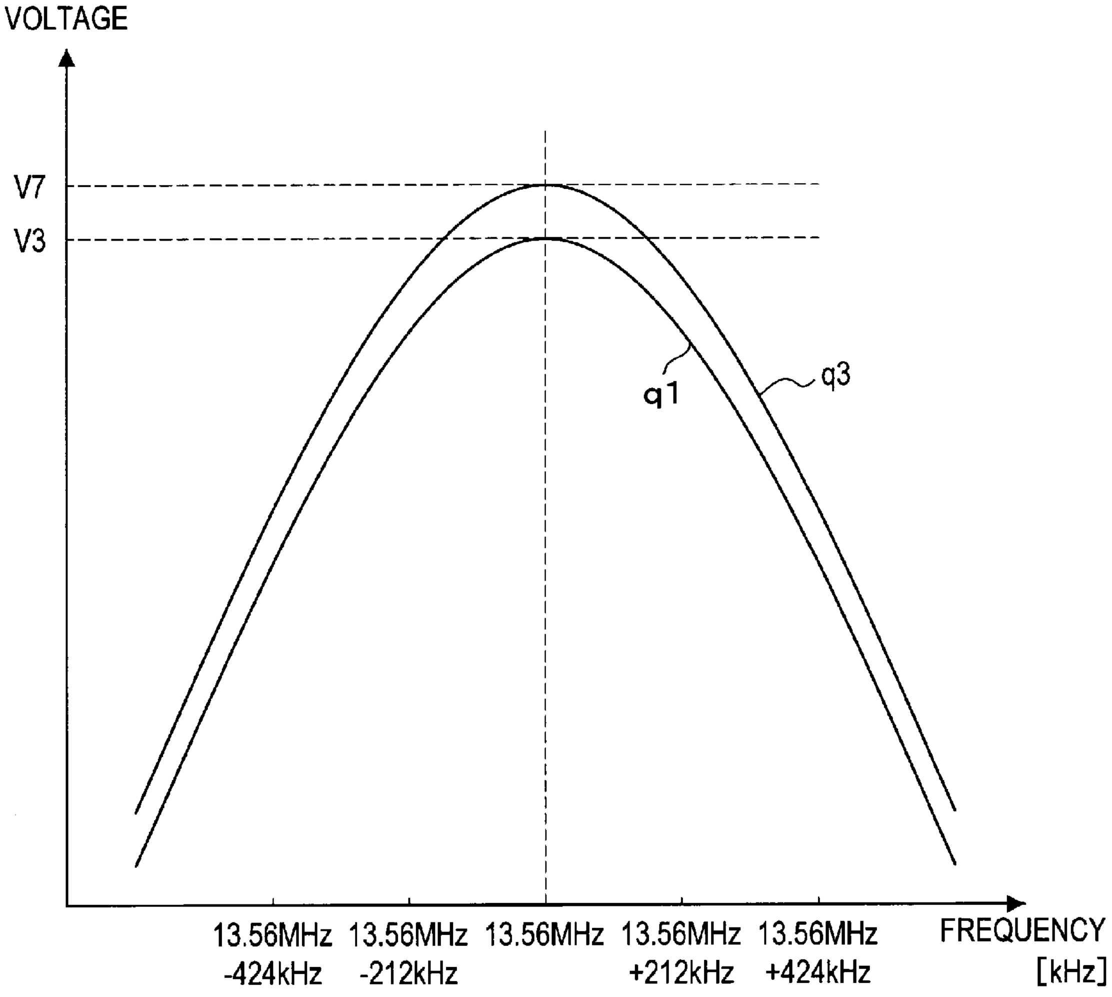
FIG. 4 is a third illustration diagram for illustrating a communication stabilization approach according to the embodiment.
Figure 5:
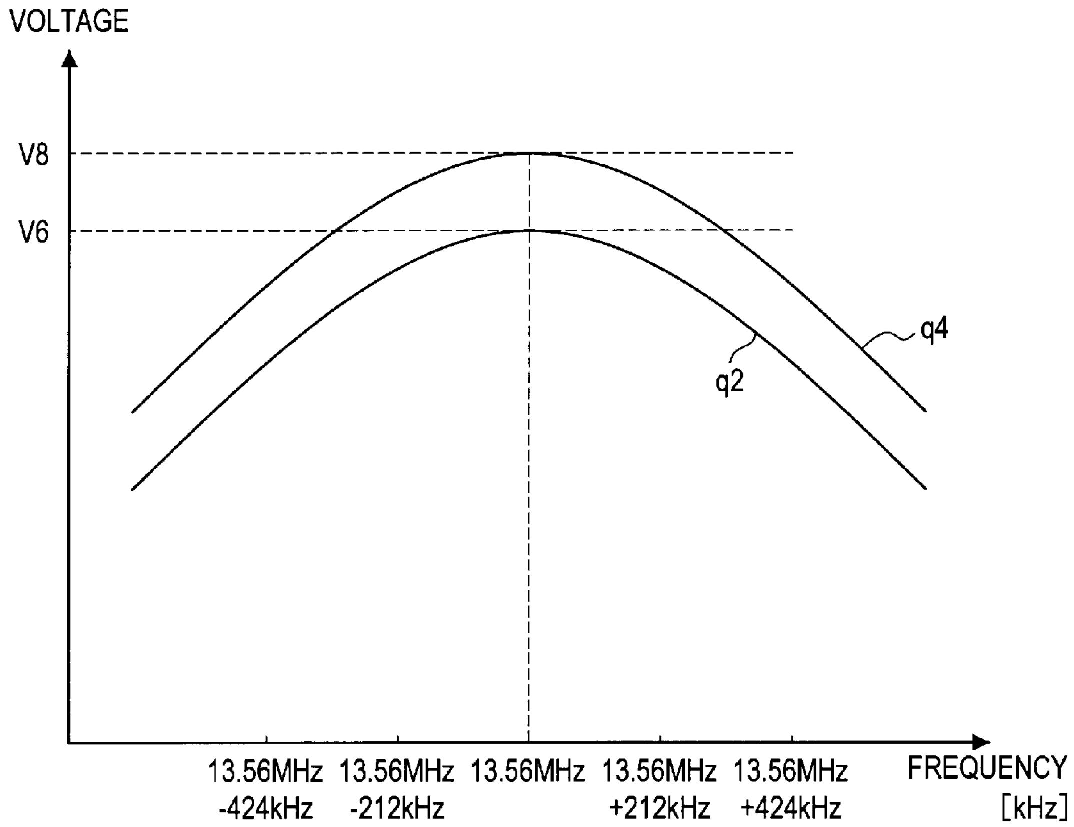
FIG. 5 is a fourth illustration diagram for illustrating a communication stabilization approach according to the embodiment.

FIG. 4 is a third illustration diagram for illustrating the communication stabilization approach according to the embodiment. FIG. 4 shows an example of the relationship between the communication speed and the voltage at the antenna end of the antenna of the reader/writer 100 as in FIG. 1. Herein, q1 in FIG. 4 indicates q1 shown in FIG. 2, and q3 in FIG. 4 represents an example of the voltage at the antenna end after the amplification when amplifying the carrier signal when the Q value of the antenna is Q=Q1. Also, FIG. 5 is a fourth illustration diagram for illustrating the communication stabilization approach according to the embodiment. FIG. 5 shows an example of the relationship between the communication speed and the voltage at the antenna end of the antenna of the reader/writer 100 as in FIG. 1. Herein, q2 in FIG. 5 indicates q2 shown in FIG. 2, and q4 in FIG. 5 represents an example of the voltage at the antenna end after the amplification when amplifying the carrier signal when the Q value of the antenna is Q=Q2.

As shown in FIGS. 4 and 5, the reader/writer 100 amplifies the carrier signal based on the communication speed corresponding to the Q value set based on the communication speed. More specifically, the reader/writer 100 changes the amplification factor in synchronization with the switching of the Q value from Q1 to Q2 (Q2<Q1) when a higher communication speed is determined as the communication speed of the communication with the information processing device 200, for example. For example, FIGS. 4 and 5 show cases in which the reader/writer 100 sets the amplification factor when the Q value of the antenna is Q2 larger than the amplification factor when the Q value of the antenna is Q1 ({V8−V6} (FIG. 5)>{V7−V3} (FIG. 4)).

Herein, as an example of the amplification in the reader/writer 100, for example, there is a case in which the amplification factor is changed to raise a signal level of the carrier signal by 0.5 dB when the Q value of the antenna is changed from 50 to 40 (corresponding to the switching from q1 to q2 shown in FIG. 2). It goes without saying that relationship between the switching of the Q value of the antenna and the amplification of the carrier signal is not limited to the above-described example.

The reader/writer 100 according to the embodiment may amplify the carrier signal with a constant amplification factor without depending on the communication speed. In the above-described case, it is possible to raise the output of the carrier than in the case of applying the first communication stabilization approach, for example. However, especially, when the communication speed becomes higher, the communication may be more stabilized by changing the amplification factor based on the communication speed according to the second communication stabilization approach than in the case of the constant amplification factor without depending on the communication speed. Also, when amplifying the carrier signal, an amplifier composed of a switched capacitor circuit, an operational amplifier and the like, and a MOSFET parametric amplifier composed of a metal oxide semiconductor field effect transistor (MOSFET) are used, for example. Herein, the above-described amplifier consumes electricity according to the amplification factor for amplifying the signal, for example. Therefore, when stabilizing the communication at a higher communication speed while amplifying the carrier signal with the constant amplification factor without depending on the communication speed, the amplification factor of the amplifier has to be set to a value with which the stabilization of the communication is possible at the high communication speed, for example. On the other hand, in the second communication stabilization approach, the amplification factor is set to that corresponding to the communication speed based on the communication speed. Therefore, it is possible to save more electricity by changing the amplification factor based on the communication speed according to the second communication stabilization approach than by setting to the constant amplification factor without depending on the communication speed.

The output of the carrier may be raised by changing the amplification factor to amplify the carrier signal based on the communication speed as shown in FIGS. 4 and 5, for example, by the reader/writer 100. Also, the reader/writer 100 switches the Q value of the antenna based on the determined communication speed as in the case of the first communication stabilization approach. Therefore, by using the second communication stabilization approach, the reader/writer 100 may further stabilize the contactless communication with the information processing device 200.

[Communication Control Method According to Second Communication Stabilization Approach]

Figure 6:
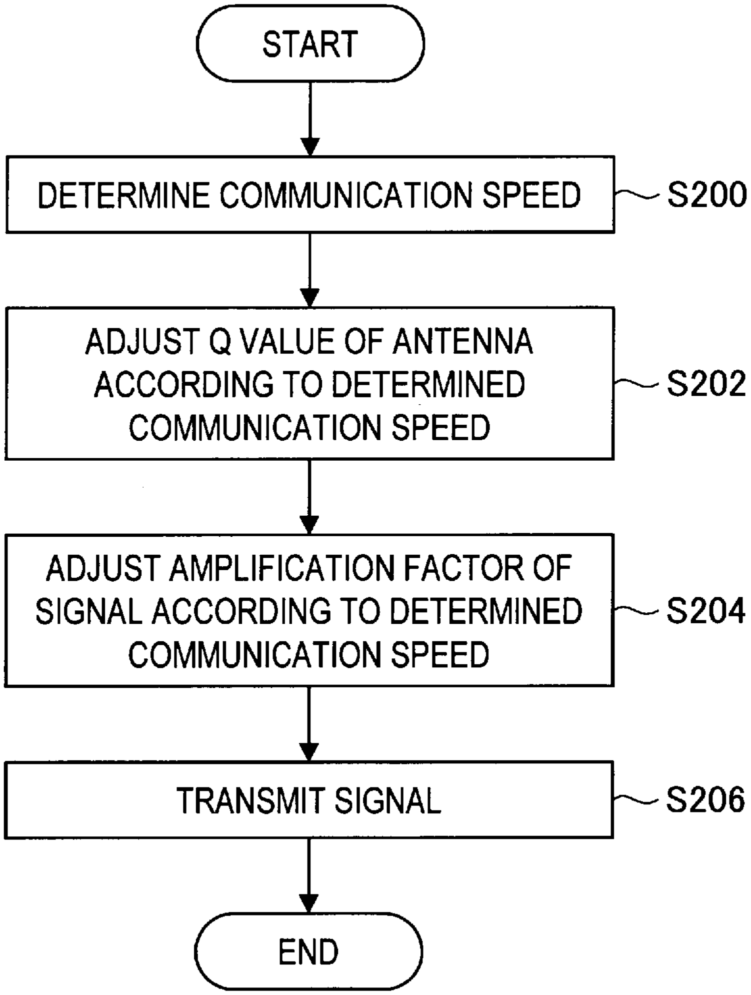
FIG. 6 is a second flowchart showing an example of a communication control method according to the embodiment.

Next, an example of the communication control method in the second communication stabilization approach according to the embodiment is described. FIG. 6 is a second flowchart showing an example of the communication control method according to the embodiment. Although it is described assuming that the communication control method shown in FIG. 6 is performed by the reader/writer 100 hereinafter, the communication control method shown in FIG. 6 may also be applied to the information processing device 200.

The reader/writer 100 determines the communication speed as in the step S100 shown in FIG. 3 (S200).

When the communication speed is determined at the step S200, the reader/writer 100 adjusts the Q value of the antenna according to the determined communication speed as in the step S102 shown in FIG. 3 (S202).

Also, when the communication speed is determined at the step S200, the reader/writer 100 adjusts the amplification factor of the carrier signal according to the determined communication speed (S204). Herein, although the reader/writer 100 adjusts the amplification factor by changing the load resistance, which composes the amplifier, based on the determined communication speed (for example, by selectively activating the resistance), for example, this is not limited to the above description. Also, when the information processing device 200 performs the communication control method shown in FIG. 6, the process of the step S204 corresponds to the adjustment of the amplification factor of the response signal, for example.

Although the example in which the process of the step S204 is performed after the process of the step S202 is shown in FIG. 6, the process of the step S202 and the process of the step S204 may be performed so as to be independent of each other. Therefore, the reader/writer 100 may perform the processes of the steps S202 and S204 in synchronization with each other, or may perform the process of the step S202 after the process of the step S204.

When the adjustment of the Q value of the antenna and the adjustment of the amplification factor of the signal are performed at the steps S202 and S204, the reader/writer 100 transmits the carrier signal to the information processing device 200 as in the step S104 shown in FIG. 3 (S206).

The reader/writer 100 may perform the communication with the information processing device 200 after adjusting the Q value of the antenna and the amplification factor of the signal according to the communication speed, by using the method shown in FIG. 6, for example. Therefore, the reader/writer 100 may stabilize the contactless communication by using the method shown in FIG. 6, for example.

The communication system 1000 according to the embodiment stabilizes the contactless communication by applying the above-described first or second communication stabilization approach to the reader/writer 100 and/or the information processing device 200, for example.

(Communication System 1000 According to Embodiment)

Next, a configuration example of the communication system 1000 according to the embodiment capable of realizing the above-described communication stabilization approach according to the embodiment is described. Hereinafter, as the configuration example of the communication system 1000, the reader/writer 100 to which the second communication stabilization approach is applied and the information processing device 200 to which the first communication stabilization approach is applied are described. As described above, the first communication stabilization approach may be applied to the reader/writer 100 according to the embodiment, and the second communication stabilization approach may be applied to the information processing device 200 according to the embodiment.

[Reader/Writer 100]

Figure 7:
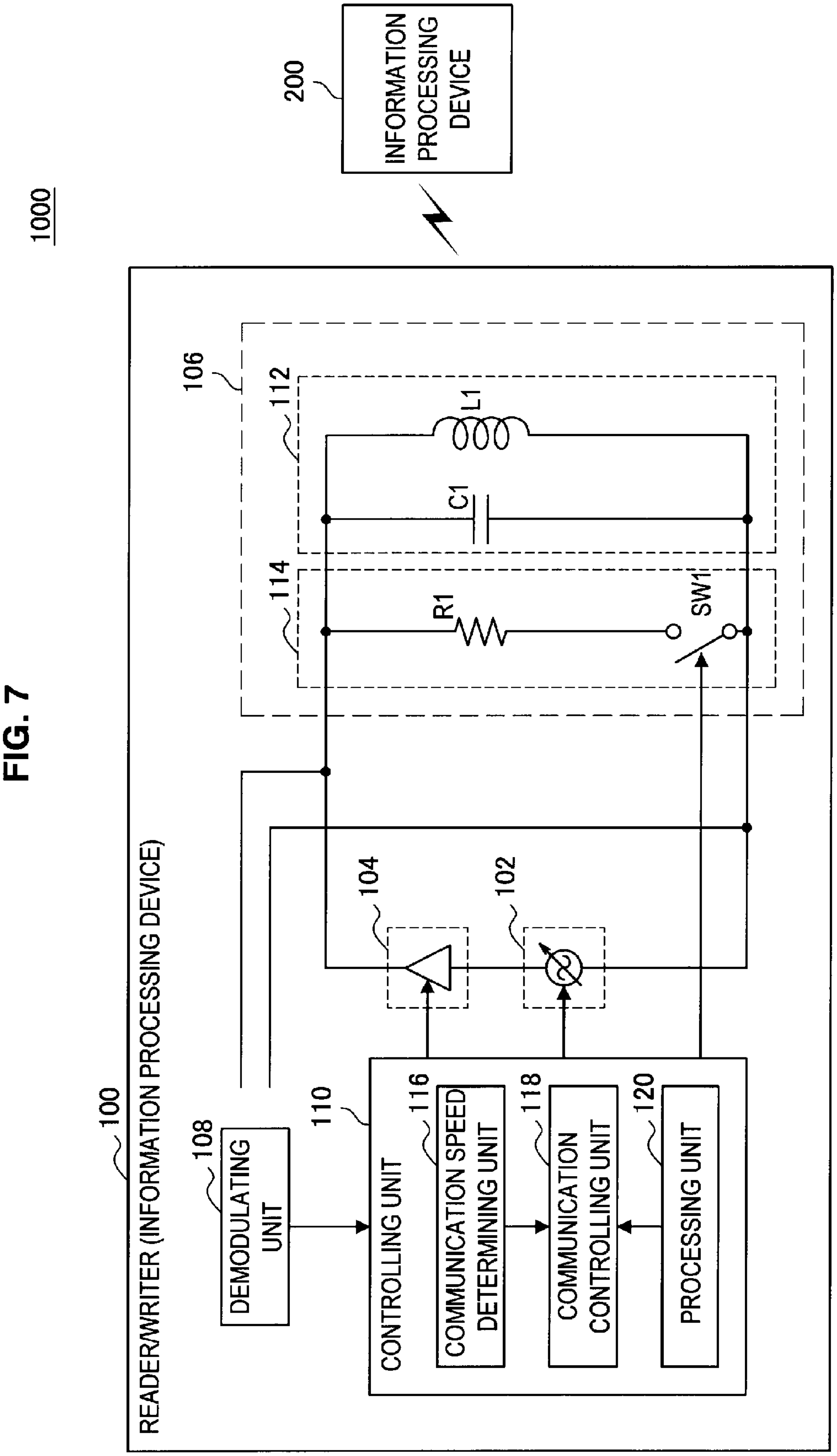
FIG. 7 is an illustration diagram showing an example of a configuration of a reader/writer according to the embodiment.

FIG. 7 is an illustration diagram showing an example of a configuration of the reader/writer 100 according to the embodiment. Herein, FIG. 7 also shows the information processing device 200, which performs the contactless communication with the reader/writer 100. A configuration example of the information processing device 200 is described later with reference to FIG. 8.

The reader/writer 100 is provided with a carrier signal generating unit 102, an amplifying unit 104, a communication antenna 106, a demodulating unit 108 and a controlling unit 110. Also, although not shown in FIG. 7, the reader/writer 100 may be provided with a rectifier circuit between the communication antenna 106 and the demodulating unit 108.

Also, the reader/writer 100 may be provided with the ROM (not shown), a random access memory (RAM; not shown), a storage unit (not shown) and an interface (not shown) to connect to an external device (not shown) and another circuit. The reader/writer 100 may connect each of the components by a bus as a transmission path of data, for example. The ROM stores data for control such as a program and a calculation parameter used by the controlling unit 110 and the above-described communication setting information. The RAM primarily stores the program executed by the controlling unit 110 and the like. The storage unit (not shown) stores an application and the data used in the reader/writer 100. Herein, although there are a magnetic recording medium such as a hard disk and a nonvolatile memory such as a flash memory as the storage unit (not shown), for example, this is not limited to the above description. Also, although there are a universal asynchronous receiver transmitter (UART), a network terminal and the like as the interface (not shown), for example, this is not limited to the above description.

The carrier signal generating unit 102 is controlled by the controlling unit 110 (more specifically, a communication controlling unit 118 to be described), and receives a carrier signal generation instruction transmitted from the controlling unit 110 to generate the carrier signal according to the carrier signal generation instruction, for example. Herein, although an alternating-current source is shown as the carrier signal generating unit 102 in FIG. 7, the carrier signal generating unit 102 according to the embodiment is not limited to the above description. For example, the carrier signal generating unit 102 according to the embodiment is further provided with a modulation circuit (not shown) for performing the ASK modulation. Although the carrier signal generated by the carrier signal generating unit 102 may include various processing instructions to the information processing device 200 and the data to be processed, for example, this is not limited to the above description. For example, the carrier signal according to the embodiment may be a signal to generate the carrier for supplying electricity to the information processing device 200 in the communication antenna 106.

The amplifying unit 104 has a variable amplification factor, amplifies the carrier signal generated by the carrier signal generating unit 102 with a set amplification factor, and transmits the amplified carrier signal to the communication antenna 106. Also, the amplifying unit 104 is controlled by the controlling unit 110 (more specifically, the communication controlling unit 118 to be described), and the amplification factor of the amplifying unit 104 is set according to an amplification factor setting signal based on the determined communication speed transmitted from the controlling unit 110, for example. Herein, the amplifying unit 104 is composed of the amplification circuit such as the operational amplifier, and may set to the amplification factor based on the amplification factor setting signal by changing a resistance value of the load resistance, which defines the amplification factor based on the amplification factor setting signal; however, this is not limited to the above description. Also, the above-described load resistance is composed of, for example, a switching device for selectively activating the resistance according to a plurality of resistances and amplification factor setting signals, and a variable resistance of which resistance value varies according to the amplification factor setting signal.

The communication antenna 106 is composed of a resonance circuit 112, which serves as the antenna, and a Q value adjustment circuit 114. The communication antenna 106 transmits the carrier according to the carrier signal generated by the carrier signal generating unit 102 (more strictly, the carrier signal transmitted from the amplifying unit 104), and the communication antenna 106 receives the response signal from the information processing device 200.

Herein, the resonance circuit 112 is composed of a coil (inductor) L1 having predetermined inductance, which serves as the antenna, and a capacitor having a predetermined electrostatic capacitance, for example. Also, a resonance frequency of the resonance circuit is set in accordance with the frequency of the carrier such as 13.56 MHz, for example.

The Q value adjustment circuit 114 is controlled by the controlling unit 110 (more specifically, the communication controlling unit 118 to be described), and adjusts the Q value of the communication antenna 106 according to the setting signal based on the determined communication speed transmitted from the controlling unit 110, for example. Herein, although the example in which the Q value adjustment circuit 114 is composed of a resistance R1 and a switching device SW1 for connecting (activating) the resistance R1 (load) according to a signal level (high level/low level) of the setting signal transmitted from the controlling unit 110 is shown in FIG. 7, this is not limited to the above description. For example, the Q value adjustment circuit 114 may be composed of the variable resistance (load) of which resistance value is changed according to a size of the transmitted setting signal (for example, a voltage signal). Also, the Q value adjustment circuit 114 may be composed of a plurality of resistances (resistances of which resistance values are different, or the resistances of which resistance values are the same) and the switching device for selectively connecting a plurality of resistances (connecting any one or a plurality of resistances). The above-described switching device may be composed of one or two or more MOSFETs (for example, a p-channel type MOSFET and an n-channel type MOSFET) to a control terminal of which the setting signal is transmitted, for example; however, this is not limited to the above description.

The demodulating unit 108 envelope detects an amplitude change of the voltage at the antenna end of the communication antenna 106 and binalizes the detected signal, thereby demodulating the response signal from the information processing device 200, for example.

The controlling unit 110 is composed of an integrated circuit and the like in which an MPU and various processing circuits are integrated, for example, and controls an entire reader/writer 100 and performs a variety of processes. Also, the controlling unit 110 is provided with a communication speed determining unit 116, the communication controlling unit 118 and a processing unit 120.

The communication speed determining unit 116 determines the communication speed regarding the contactless communication with the external device such as the information processing device 200. Then, the communication speed determining unit 116 generates communication speed information indicating the determined communication speed to transmit to the communication controlling unit 118. Herein, the communication speed determining unit 116 determines the communication speed by the method of determining the communication speed shown in the above-described (a) and (b), for example. More specifically, the communication speed determining unit 116 reads the communication setting information from the ROM, and determines the communication speed based on the information of the communication speed included in the read communication setting information, for example (the above-described first method of determining the communication speed). Also, the communication speed determining unit 116 allows the carrier signal generating unit 102 to generate the carrier signal corresponding to the communication speed request, and determines the communication speed based on the information of the communication speed of the information processing device 200 corresponding to the communication speed request transmitted from the demodulating unit 108, for example (the above-described second method of determining the communication speed). The method of determining the communication speed in the communication speed determining unit 116 is not limited to the above description.

The communication controlling unit 118 controls the carrier signal generating unit 102, the amplifying unit 104 and the Q value adjustment circuit 114. More specifically, the communication controlling unit 118 generates the carrier signal generation instruction according to the data to be transmitted to the external device such as the information processing device 200 and various instructions to transmit to the carrier signal generating unit 102, for example. Also, the communication controlling unit 118 generates the setting signal according to the communication speed indicated by the communication speed information based on the communication speed information transmitted from the communication speed determining unit 116 to transmit to the Q value adjustment circuit 114, for example. Therefore, the Q value of the communication antenna 106 is set to a value corresponding to the determined communication speed. Further, the communication controlling unit 118 generates the amplification factor setting signal according to the communication speed indicated by the communication speed information based on the communication speed information transmitted from the communication speed determining unit 116 to transmit to the amplifying unit 104, for example. Therefore, the amplification factor of the signal in the amplifying unit 104 is set to the value corresponding to the determined communication speed, that is to say, the value corresponding to the Q value of the communication antenna 106.

The processing unit 120 processes the response signal demodulated by the demodulating unit 108. Also, the processing unit 120 transmits a processed result to the communication controlling unit 118 to allow the communication controlling unit 118 to generate the carrier generation instruction, for example. Also, the processing unit 120 may transmit the data corresponding to the processed result to the external device (not shown) through the interface (not shown).

The controlling unit 110 is provided with the communication speed determining unit 116, the communication controlling unit 118 and the processing unit 120, thereby determining the communication speed of the contactless communication with the external device such as the information processing device 200, for example, and plays a main role to realize the communication stabilization approach according to the embodiment.

The reader/writer 100 determines the communication speed by the above-described configuration, for example, and adjusts the Q value of the communication antennal 106 and adjusts the amplification factor of the signal based on the determined communication speed. Therefore, the reader/writer 100 may realize the above-described communication stabilization approach according to the embodiment and stabilizes the contactless communication with the information processing device 200.

Although the configuration in which the reader/writer 100 adjusts the amplification factor of the amplifying unit 104 based on the determined communication speed (configuration regarding the second communication stabilization approach) is shown in FIG. 7, this is not limited to the above description. For example, the reader/writer 100 according to the embodiment may have a configuration to make the amplification factor of the amplifying unit 104 constant, and may have the configuration without including the amplifying unit 104 (configuration regarding the first communication stabilization approach). Even with the above-described configuration, the reader/writer 100 according to the embodiment may stabilize the contactless communication with the information processing device 200 by switching the Q value of the communication antenna 106 according to the communication speed as shown in FIG. 2, for example.

[Information Processing Device 200]

Figure 8:
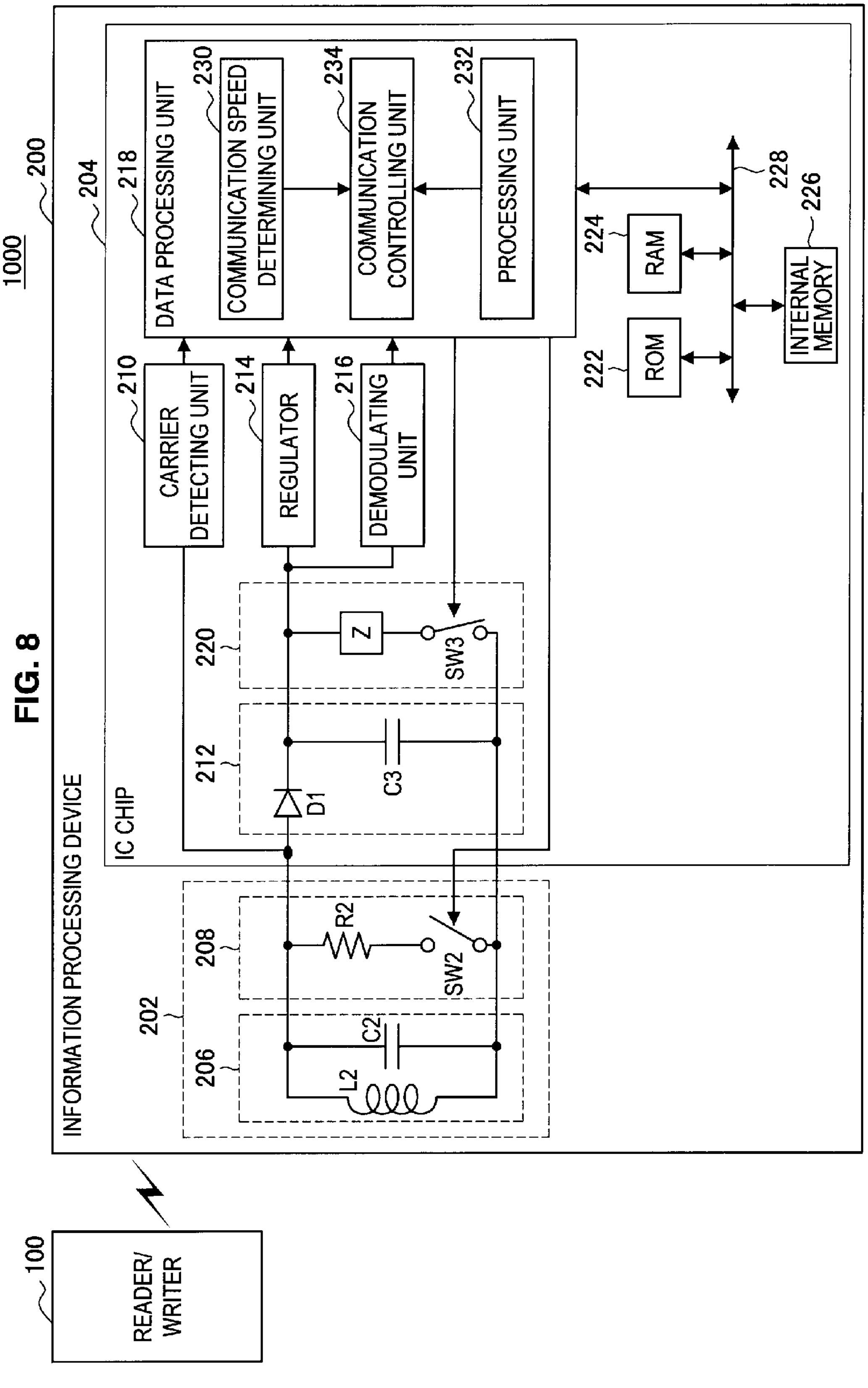
FIG. 8 is an illustration diagram showing an example of a configuration of an information processing device according to the embodiment.

Next, the configuration example of the information processing device 200 according to the embodiment is described. FIG. 8 is an illustration diagram showing an example of the configuration of the information processing device 200 according to the embodiment. Herein, FIG. 8 also shows the reader/writer 100. Also, in FIG. 8, an IC card is illustrated as an example of the information processing device 200 according to the embodiment. The information processing device 200 according to the embodiment is not limited to the IC card.

The information processing device 200 is provided with a communication antenna 202 capable of receiving the carrier and an IC chip 204 capable of demodulating the carrier signal to process based on the received carrier and of allowing the communication antenna 202 to transmit the response signal by the load modulation.

[Another Configuration Example of Information Processing Device 200]

Also, when the information processing device 200 according to the embodiment is a device such as a portable communication device such as a cell phone, the information processing device 200 according to the embodiment may further be provided with a variety of components in addition to components shown in FIG. 8. In the above-described case, as the components further included in the information processing device 200 according to the embodiment, there are a controlling unit (not shown), a storage unit (not shown), an operating unit (not shown), a display (not shown) and a communicating unit (not shown), for example.

Herein, the controlling unit (not shown) is composed of the MPU and the like, and serves to control an entire information processing device 200 according to the embodiment. Also, the controlling unit (not shown) processes the data transmitted from the IC chip 204 or performs a process according to user operation using the operating unit (not shown), for example.

The storage unit (not shown) is a storage unit included in the information processing device 200 according to the embodiment, for storing a variety of data such as various data and applications. Herein, as the storage unit (not shown), there are the magnetic recording medium such as the hard disk and the nonvolatile memory such as the flash memory, however, this is not limited to the above description.

The operating unit (not shown) is an operating unit included in the information processing device 200 according to the embodiment enabling the operation by the user. The information processing device 200 according to the embodiment may perform the process desired by the user by including the operating unit (not shown). Herein, although there are an operation input device such as a keyboard and a mouse, a button, a directional key and a rotary selector such as a jog dial, or a combination of them as the operating unit (not shown), for example, this is not limited to the above description.

The display (not shown) is a display included in the information processing device 200 according to the embodiment, for displaying a variety of pieces of information on a display screen. As a screen displayed on the display screen of the display (not shown), there is an operation screen for causing the information processing devicel 200 according to the embodiment, to execute an operation desired by user, and the like. Herein, although there are a liquid crystal display (LCD), an organic electroluminescence display (organic EL display, also referred to as an organic light emitting diode display (OLED display)) and the like as the display (not shown), this is not limited to the above description.

The communicating unit (not shown) is a communicating unit included in the information processing device 200 according to the embodiment, for performing wireless/wired communication with the external device such as a server through a network (not shown) (or directly), for example. That is to say, the communicating unit (not shown) serves as another communicating unit for communicating with the external device using a communication path other than the communication path using the carrier. Herein, although there are a wireless network such as a wireless wide area network (WWAN) through a base station and a wireless metropolitan area network (WMAN), a wired network such as a local area network (LAN) and a wide area network (WAN), or the Internet using a communication protocol such as a transmission control protocol/Internet protocol (TCP/IP) as the network (not shown), for example, this is not limited to the above description. Also, the communicating unit (not shown) may have the configuration, which supports the network (not shown).

As described above, the information processing device 200 according to the embodiment may have a variety of configurations without being limited to the configuration shown in FIG. 8. Even in a case of the above-described configuration, the information processing device 200 according to the embodiment may realize the communication stabilization approach according to the embodiment as in the case of the information processing device 200 shown in FIG. 8 to be described below.

Referring again to FIG. 8, the configuration of the information processing device 200 is described. The communication antenna 202 is composed of a resonance circuit 206, which serves as the antenna, and a Q value adjustment circuit 208.

The resonance circuit 206 is composed of a coil (inductor) L2 having predetermined inductance and a capacitor C2 having a predetermined electrostatic capacitance, for generating an induced voltage by electromagnetic induction according to the reception of the carrier. Then, the resonance circuit 206 outputs a received voltage obtained by resonating the induced voltage with a predetermined resonance frequency to the IC chip 204. Herein, the resonance frequency in the resonance circuit 206 is set in accordance with the frequency of the carrier such as 13.56 MHz, for example. The communication antenna 152 has the resonance circuit 206, thereby receiving the carrier, and transmits the response signal by the load modulation performed in the load modulating unit 220 included in the IC chip 204.

The Q value adjustment circuit 208 serves to adjust the Q value of the communication antenna 202 as in the case of the Q value adjustment circuit 114 regarding the reader/writer 100 shown in FIG. 7. Also, the Q value adjustment circuit 208 is controlled by the setting signal transmitted from the data processing unit 218 included in the IC chip 204 to be described later. Herein, although an example in which the Q value adjustment circuit 208 is composed of a resistance R2 and a switching device SW2 is shown in FIG. 8, this is not limited to the above description. For example, the Q value adjustment circuit 208 may have a variety of configurations as in the case of the Q value adjustment circuit 114 regarding the reader/writer 100 shown in FIG. 7.

The IC chip 204 is obtained by realizing a variety of functions regarding the contactless communication using the carrier with the reader/writer 100 by the integrated circuit. Hereinafter, an example of the configuration of the IC chip 204 is described.

[Configuration Example of IC Chip 204]

The IC chip 204 is provided with a carrier detecting unit 210, a wave detecting unit 212, a regulator 214, a demodulating unit 216, a data processing unit 218 and a load modulating unit 220. Although not shown in FIG. 8, the IC chip 204 may further be provided with a protection circuit (not shown) for preventing overvoltage and overcurrent from being applied to the data processing unit 218, for example. Herein, although there is a clamp circuit composed of a diode and the like as the protection circuit (not shown), for example, this is not limited to the above description.

Also, the IC chip 204 is provided with a ROM 222, a RAM 224, an internal memory 226 and the like. The data processing unit 218, the ROM 222, the RAM 224 and the internal memory 226 are connected by a bus 228 as a transmission path of the data, for example. The ROM 222 stores the data for control such as the program and the calculation parameter used by the data processing unit 218, the communication setting information including the information of the communication speed, which the information processing device 200 supports, and the like. The RAM 224 primarily stores the program executed by the data processing unit 218, a calculation result, an execution state and the like. The internal memory 226 is the storage unit included in the IC chip 204, for storing the data processed by the data processing unit 218, for example. Herein, although there are the nonvolatile memory such as an electrically erasable and programmable read only memory (EEPROM), the flash memory, a magnetoresistive random access memory (MRAM), a ferroelectric random access memory (FeRAM) and a phase change random access memory (PRAM) as the internal memory 226, for example, this is not limited to the above description.

The carrier detecting unit 210 generates a rectangular detection signal, for example, based on the received voltage transmitted from the communication antenna 202, and transmits the detection signal to the data processing unit 218. The data processing unit 218 uses the above-described transmitted detection signal as a process clock for data processing, for example. Herein, the above-described detection signal is based on the received voltage transmitted from the communication antenna 202, so that this synchronizes with the frequency of the carrier transmitted from the reader/writer 100. Therefore, the information processing device 200 may perform the process between itself and the reader/writer 100 in synchronization with the reader/writer 100 by including the carrier detecting unit 210.

The wave detecting unit 212 rectifies the received voltage output from the communication antenna 202. Herein, although the wave detecting unit 212 may be composed of a diode D1 and a capacitor C3, for example, this is not limited to the above description.

The regulator 214 smoothes the received voltage to obtain a constant voltage, and outputs a driving voltage to the data processing unit 218. Herein, the regulator 214 may use a direct-current component of the received voltage as the driving voltage.

The demodulating unit 216 demodulates the carrier signal based on the received voltage, and outputs the data (for example, a binalized data signal of high and low levels) corresponding to the carrier signal included in the carrier. Herein, the demodulating unit 216 may output the data signal based on an alternating-current component of the received voltage.

The data processing unit 218 drives with the driving voltage output from the regulator 214 as a power source, and performs a variety of processes such as the process of the data (data signal) demodulated in the demodulating unit 216. Herein, although the data processing unit 218 may be composed of the MPU and the like, for example, this is not limited to the above description.

More specifically, the data processing unit 218 is provided with a communication speed determining unit 230, a processing unit 232 and a communication controlling unit 234, for example.

The communication speed determining unit 230 determines the communication speed regarding the contactless communication with the reader/writer 100. Then, the communication speed determining unit 230 generates the communication speed information indicating the determined communication speed to transmit to the communication controlling unit 234. Herein, the communication speed determining unit 230 determines the communication speed by the method of determining the communication speed described in the above-described (a) and (b), for example, as in the case of the communication speed determining unit 116 regarding the reader/writer 100 shown in FIG. 7. More specifically, the communication speed determining unit 230 reads the communication setting information from the ROM 222 to determine the communication speed based on the information of the communication speed included in the read communication setting information, for example (the above-described first method of determining the communication speed). Also, the communication speed determining unit 230 may grasp the communication speed, which the reader/writer 100 supports, based on the communication speed request transmitted from the reader/writer 100 demodulated by the demodulating unit 216 and determine a higher communication speed out of the communication speeds at which the normal communication is possible, for example. In the above-described case, the communication speed determining unit 230 transmits the information of the communication speed of the information processing device 200 corresponding to the communication speed request transmitted from the reader/writer 100, from the communication antenna 202 as the response signal, for example (the above-described second method of determining the communication speed). The method of determining the communication speed in the communication speed determining unit 230 is not limited to the above description.

The processing unit 232 processes the data (data signal) demodulated in the demodulating unit 216. Also, the processing unit 232 transmits a response processing instruction based on the processed result and the like to the communication controlling unit 234 when responding to the reader/writer 100 as a result of the process.

The communication controlling unit 234 generates the control signal to control the load modulation regarding the response to the reader/writer 100 based on the response processing instruction transmitted from the processing unit 232. Then, the communication controlling unit 234 selectively outputs the control signal to the load demodulating unit 220 when transmitting the response signal to the reader/writer 100. Herein, the communication controlling unit 234 generates the control signal of a clock frequency based on the communication speed information transmitted from the communication speed determining unit 230. Since the load modulating unit 220 performs the load modulation according to the control signal, in the information processing device 200, a load modulation speed is controlled by generation of the control signal based on the communication speed information by the communication controlling unit 234, and the communication speed according to the determined communication speed is realized.

Also, the communication controlling unit 234 generates the setting signal according to the communication speed indicated by the communication speed information based on the communication speed information transmitted from the communication speed determining unit 230, and transmits the setting signal to the Q value adjustment circuit 208.

The data processing unit 218 is provided with the communication speed determining unit 230, the processing unit 232 and the communication controlling unit 234, for example, thereby determining the communication speed of the contactless communication with the reader/writer 100, and plays the main role to realize the communication stabilization approach according to the embodiment.

The load modulating unit 220 is provided with a load Z and a switching device SW3, for example, and performs the load modulation by selectively connecting (activating) the load Z according to the control signal transmitted from the data processing unit 218. Herein, although the load Z is composed of the resistance having a predetermined resistance value, for example, this is not limited to the above description. Also, although the switching device SW3 is composed of the p-channel type MOSFET and the n-channel type MOSFET, for example, this is not limited to the above description.

By the load modulation performed in the load modulating unit 220, the impedance of the information processing device 200 seen from the reader/writer 100 varies.

The IC chip 204 may process the carrier signal received by the communication antenna 202 and transmit the response signal from the communication antenna 202 by the load modulation by the above-described configuration. Although the configuration in which the information processing device 200 is provided with the IC chip 204 is shown in FIG. 8, this is not limited to the above description, and the configuration in which the configuration of the IC chip 204 is not realized as the IC chip is also possible.

The information processing device 200 determines the communication speed by the above-described configuration, for example, and adjusts the Q value of the communication antenna 202 based on the determined communication speed. Therefore, the information processing device 200 may realize the above-described communication stabilization approach according to the embodiment of the application and stabilizes the contactless communication with the reader/writer 100.

Although the configuration in which the information processing device 200 adjusts the Q value of the communication antenna 202 based on the determined communication speed is shown in FIG. 8, this is not limited to the above description. For example, the information processing device 200 according to the embodiment may further be provided with the amplifying unit (not shown) within the communication antenna 202 or between the IC chip 204 and the communication antenna 202, for example (the configuration to realize the second communication stabilization approach, for example).

As described above, the communication system 1000 according to the embodiment has the reader/writer 100 and the information processing device 200 for realizing the above-described first communication stabilization approach or second communication stabilization approach. More specifically, the reader/writer 100 and the information processing device 200 determine the communication speed, and adjust the Q value of the communication antenna or perform the adjustment of the Q value of the communication antenna and the adjustment of the amplification factor of the signal, based on the determined communication speed. Therefore, both of the reader/writer 100 and the information processing device 200 may stabilize the contactless communication between the reader/writer 100 and the information processing device 200 based on the communication speed.

Also, as described above, both the reader/writer 100 and the information processing device 200 are capable of stabilizing the contactless communication. Therefore, the communication system according to the embodiment may stabilize the contactless communication more than in the communication systems to which the related art 1 and the related art 2 are applied, even with the configuration of having one of the reader/writer 100 and the information processing device 200. Therefore, the communication system capable of stabilizing the communication based on the communication speed in the contactless-type communication between the reader/writer 100 and the information processing device 200 is realized by having the reader/writer 100 and/or the information processing device 200.

Although the reader/writer 100 is described as the component to compose the communication system 1000 according to the embodiment as above, the embodiment is not limited to such embodiment. The embodiment may be applied to a variety of devices such as the portable communication device such as the cell phone having the reader/writer function (that is to say, a function to subjectively transmit the carrier), and a computer such as a personal computer (PC) having the reader/writer function, for example.

Also, although the information processing device 200 is described as the component to compose the communication system 1000 according to the embodiment, the embodiment is not limited to such embodiment. The embodiment may be applied to a variety of devices capable of performing the contactless communication with the reader/writer 100, such as the portable communication device such as the cell phone on which an RFID tag, the IC card and the IC chip are mounted, and the computer such as the PC on which the IC chip is mounted, for example.

(Program Regarding Communication System 1000 According to an Embodiment)

[Program Regarding Reader/Writer 100]

By the program to allow the computer to serve as the reader/writer 100 (information processing device) according to the embodiment, the communication may be stabilized based on the communication speed in the contactless-type communication between the reader/writer and the information processing device.

[Program Regarding Information Processing Device 200]

By the program to allow the computer to serve as the information processing device 200 according to the embodiment, the communication may be stabilized based on the communication speed in the contactless-type communication between the reader/writer and the information processing device.

It should be understood by those skilled in the art that various modifications, combinations, sub-combinations and alterations may occur depending on design requirements and other factors insofar as they are within the scope of the appended claims or the equivalents thereof.

For example, although it is described that the program (computer program) to allow the computer to serve as the reader/writer 100 (information processing device) or the information processing device 200 according to the embodiment is provided in the above description, the embodiment may further provide the storage medium in which the above-described programs are stored.

It should be understood that various changes and modifications to the presently preferred embodiments described herein will be apparent to those skilled in the art. Such changes and modifications can be made without departing from the spirit and scope and without diminishing its intended advantages. It is therefore intended that such changes and modifications be covered by the appended claims.

The application is claimed as follows:

1. An information processing device comprising:

a communication antenna having a variable Q value, for performing contactless-type communication with an external device by using a communication path capable of transmitting and receiving a signal using a carrier of a predetermined frequency;

a storage unit configured to store communication setting information including at least one communication speed supported by the information processing device, wherein a communication speed request is transmitted to the external device, the communication speed request including information on at least one communication speed supported by the information processing device other than a speed used to transmit the communication speed request and a request for communication speed information supported by the external device;

a communication speed determining unit configured to determine a communication speed in the communication with the external device based on the communication setting information stored in the storage unit and the communication speed information supported by the external device;

a communication controlling unit configured to allow the Q value of the communication antenna to be set to a value corresponding to a determined communication speed based on the communication speed determined in the communication speed determining unit;

a carrier signal generating unit configured to generate a carrier signal of the predetermined frequency to be transmitted to the external device, wherein the communication speed determining unit allows the carrier signal generating unit to generate the carrier signal corresponding to the communication speed request; and an amplifying unit having a variable amplification factor, configured to amplify the carrier signal with a set amplification factor to transmit to the communication antenna, wherein the amplification factor of the amplifying unit is set to a value corresponding to the Q value of the communication antenna based on the communication speed determined in the communication speed determining unit.

2. The information processing device according to claim 1, wherein the communication speed determining unit selectively changes the communication speed during the communication based on the communication with the external device, and generates communication speed information indicating a changed communication speed to transmit to the communication controlling unit when the communication speed is changed, and the communication controlling unit sets the Q value of the communication antenna to a value corresponding to the communication speed indicated by the communication speed information according to transmission of the communication speed information.

3. The information processing device according to claim 1, wherein the communication controlling unit selectively transmits a setting signal to set the Q value to the communication antenna based on the communication speed determined in the communication speed determining unit, and the communication antenna includes a resonance circuit having a coil having predetermined inductance and a capacitor having a predetermined electrostatic capacitance, and a Q value adjustment circuit configured to selectively activate a load for changing the Q value according to the setting signal or changing a resistance value of the load according to the setting signal.

4. The information processing device according to claim 1, wherein the information processing device is a portable communication device.

5. The information processing device according to claim 1, wherein the information processing device is an IC card.

6. A method of controlling communication by an information processing apparatus, comprising:

storing communication setting information including at least one supported communication speed;

transmitting a communication speed request to an external device, the communication speed request including information on at least one communication speed supported by the information processing device other than a speed used to transmit the communication speed request and a request for communication speed information supported by the external device;

determining a communication speed in communication with the external device through a communication antenna having a variable Q value for performing contactless-type communication with the external device by using a communication path capable of transmitting and receiving a signal using a carrier of a predetermined frequency, wherein the communication speed is determined based on the stored communication setting information and the communication speed information supported by the external device;

allowing the Q value of the communication antenna to be set to a value corresponding to a determined communication speed based on the communication speed determined at the step of determining;

generating a carrier signal of the predetermined frequency to be transmitted to the external device, wherein the generated carrier signal corresponds to the communication speed request; and amplifying the carrier signal with a set amplification factor to transmit to the communication antenna, wherein the amplification factor is set to a value corresponding to the Q value of the communication antenna based on the determined communication speed.

7. A non-transitory computer readable storage medium storing a computer program causing an information processing device to:

store communication setting information including at least one communication speed supported by the information processing device;

transmit a communication speed request to an external device, the communication speed request including information on at least one communication speed supported by the information processing device other than a speed used to transmit the communication speed request and a request for communication speed information supported by the external device;

determine a communication speed in communication with an external device through a communication antenna having a variable Q value for performing contactless-type communication with the external device by using a communication path capable of transmitting and receiving a signal using a carrier of a predetermined frequency, wherein the communication speed is determined based on the stored communication setting information and the communication speed information supported by the external device;

allow the Q value of the communication antenna to be set to a value corresponding to a determined communication speed based on the communication speed determined at the step of determining;

generate a carrier signal of the predetermined frequency to be transmitted to the external device, wherein the generated carrier signal corresponds to the communication speed request; and amplify the carrier signal with a set amplification factor to transmit to the communication antenna, wherein the amplification factor is set to a value corresponding to the Q value of the communication antenna based on the determined communication speed.

8. The information processing device according to claim 1, wherein the communication controlling unit adjusts the amplification factor of the amplifying unit by changing a load resistance based on the determined communication speed.

9. The information processing device according to claim 1, wherein the information processing device is an IC card and the external device is a reader/writer, and the communication speed determining unit determines the communication speed in the communication between the IC card and the reader/writer.

10. The information processing device according to claim 1, wherein the communication speed determining unit receives a response to the communication speed request including the communication speed information supported by the external device.

11. The information processing device according to claim 1, wherein the communication speed information supported by the external device is received based on the at least one communication speed supported by the information processing device other than the speed used to transmit the communication speed request included in the communication speed request.

* * * * *